(12) United States Patent
Kadoi et al.

(10) Patent No.: US 11,728,519 B2
(45) Date of Patent: Aug. 15, 2023

(54) SECONDARY BATTERY

(71) Applicant: Prime Planet Energy & Solutions, Inc., Tokyo (JP)

(72) Inventors: Masafumi Kadoi, Chita (JP); Takahiro Sakurai, Nagoya (JP); Yasuhiro Sakashita, Nisshin (JP)

(73) Assignee: PRIME PLANET ENERGY & SOLUTIONS, INC., Tokyo (JP)

( * ) Notice: Subject to any disclaimer, the term of this patent is extended or adjusted under 35 U.S.C. 154(b) by 146 days.

(21) Appl. No.: 17/470,114

(22) Filed: Sep. 9, 2021

(65) Prior Publication Data

US 2022/0085422 A1 Mar. 17, 2022

(30) Foreign Application Priority Data

Sep. 17, 2020 (JP) .................... 2020-156474

(51) Int. Cl.
| | |
|---|---|
| *H01M 10/0587* | (2010.01) |
| *H01M 10/04* | (2006.01) |
| *H01M 10/0585* | (2010.01) |
| *H01M 4/38* | (2006.01) |
| *H01M 50/103* | (2021.01) |
| *H01M 4/134* | (2010.01) |
| *H01M 10/0525* | (2010.01) |

(52) U.S. Cl.
CPC ......... *H01M 10/0587* (2013.01); *H01M 4/38* (2013.01); *H01M 10/0431* (2013.01); *H01M 10/0585* (2013.01); *H01M 50/103* (2021.01); *H01M 4/134* (2013.01); *H01M 10/0525* (2013.01)

(58) Field of Classification Search
None
See application file for complete search history.

(56) References Cited

U.S. PATENT DOCUMENTS

2019/0165425 A1 5/2019 Suzuki

FOREIGN PATENT DOCUMENTS

| JP | H87882 A | 1/1996 |
|---|---|---|
| JP | H9-298057 A | 11/1997 |
| JP | H11-97055 A | 4/1999 |
| JP | 2005-122940 A | 5/2005 |
| JP | 201114238 A | 1/2011 |
| JP | 2016-207576 A | 12/2016 |
| JP | 2019-96524 A | 6/2019 |

*Primary Examiner* — Sarah A. Slifka
(74) *Attorney, Agent, or Firm* — Hauptman Ham, LLP

(57) ABSTRACT

The secondary battery includes: a square battery case; and a wound electrode body accommodated in the battery case. The wound electrode body has a positive electrode sheet and a negative electrode sheet overlapping with each other to be wound about a winding axis to have a rectangular shape when seen from a winding axis direction. The wound electrode body has corner parts positioned at four corners of the wound electrode body when seen from the winding axis direction. The positive electrode sheet has a positive electrode collector and a positive electrode active material layer. The negative electrode sheet has a negative electrode collector and a negative electrode active material layer. Folding grooves are formed along the winding axis direction at portions of the positive electrode active material layer or portions of the negative electrode active material layer that are positioned at the corner parts.

7 Claims, 6 Drawing Sheets

SECONDARY BATTERY

CROSS REFERENCE TO RELATED APPLICATIONS

The present application claims priority based on Japanese Patent Application No. 2020-156474 filed on Sep. 17, 2020, the entire contents of which are incorporated herein by reference.

BACKGROUND

The present invention relates to a secondary battery.

For example, Japanese Patent Application Laid-open No. 2016-207576 discloses a secondary battery including a square battery case, a flat wound electrode body accommodated in the battery case, and a nonaqueous electrolyte solution. The flat wound electrode body is one in which a positive electrode sheet, a negative electrode sheet, and a separator interposed between the positive electrode sheet and the negative electrode sheet are overlapped with each other and wound flatly. Further, the flat wound electrode body includes two R-parts provided at both ends in one direction orthogonal to a winding axis direction and a flat surface part held between the two R-parts. When seen from the winding axis direction, the outer peripheral shape of the flat wound electrode body is constituted by the two R-parts and the flat surface part.

Further, Japanese Patent Application Laid-open No. 2005-122940 discloses a secondary battery including an electrode body having a base member constituted by a battery insulation substrate, a semiconductor substrate, or the like and a battery layer provided on one surface of the base member. The battery layer includes a positive electrode collector, a positive electrode active material layer, a solid electrolyte layer, a negative electrode active material layer, and a negative electrode collector. Notches are formed on a surface of the base member on an opposite side to the surface on which the battery layer is provided. The electrode body is folded at the notches to be wound or folded zigzag.

Meanwhile, a gap is formed between the inner peripheral surface of the battery case and the two R-parts of the flat wound electrode body when the flat wound electrode body disclosed in Japanese Patent Application Laid-open No. 2016-207576 is accommodated in the square battery case. The gap is preferably smaller in size since the gap may possibly result in a dead space. It is assumed that the curvature radius of the R-parts is, for example, reduced to make the gap small. In view of this, it is assumed that the notches disclosed in Japanese Patent Application Laid-open No. 2005-122940 are, for example, formed on the above flat wound electrode body for easier folding and making the curvature radius of the R-part small. However, the flat wound electrode body disclosed in Japanese Patent Application Laid-open No. 2016-207576 is not provided with a base member, and therefore the formation of the notches on the base member is not possible.

SUMMARY

A secondary battery proposed here includes: a square battery case; and a wound electrode body accommodated in the battery case. The wound electrode body has a positive electrode sheet and a negative electrode sheet at least overlapping with each other to be wound about a winding axis to have a rectangular shape when seen from a winding axis direction. The wound electrode body has corner parts positioned at four corners of the wound electrode body when seen from the winding axis direction. The positive electrode sheet has a positive electrode collector and a positive electrode active material layer formed on the positive electrode collector. The negative electrode sheet has a negative electrode collector and a negative electrode active material layer formed on the negative electrode collector. Folding grooves are formed along the winding axis direction in at least one of the positive electrode active material layer and the negative electrode active material layer at positions corresponding to the corner parts about the winding axis in the positive electrode sheet and the negative electrode sheet.

According to the secondary battery proposed here, the wound electrode body is easily folded since at least any one of the positive electrode sheet and the negative electrode sheet is foldable along the folding grooves when the wound electrode body is wound. Accordingly, the shape of the wound electrode body when seen from the winding axis direction is easily formed into a rectangular shape. Further, since the rectangular wound electrode body is accommodated in the square battery case, a dead space between the battery case and the wound electrode body may be reduced. As a result, an improvement in the volume efficiency of the wound electrode body is allowed.

In the secondary battery proposed here, the positive electrode active material layer may have an inside positive electrode active material layer formed on a surface of the positive electrode collector on the winding axis side, and an outside positive electrode active material layer formed on a surface of the positive electrode collector on an opposite side thereof to the winding axis. The folding grooves may have an inside positive electrode folding groove formed on the inside positive electrode active material layer, and an outside positive electrode folding groove formed on the outside positive electrode active material layer.

In the secondary battery proposed here, a width of the inside positive electrode folding groove may be greater than a width of the outside positive electrode folding groove. The width of the inside positive electrode folding groove may be same as or greater than a thickness of the inside positive electrode active material layer. Further, a cross-sectional shape of the inside positive electrode folding groove may be different from a cross-sectional shape of the outside positive electrode folding groove.

In the secondary battery proposed here, the folding grooves may be formed on the positive electrode active material layer. When an axis passing through the winding axis and extending in a reference direction crossing the winding axis direction is defined as a reference axis when seen from the winding axis direction, the corner parts may have a first corner part and a second corner part positioned on one side of the reference axis when seen from the winding axis direction. When an folding groove of the folding grooves that is formed at a portion of the positive electrode active material layer at a position corresponding to the first corner part about the winding axis is defined as a first positive electrode folding groove and an folding groove of the folding grooves that is formed at a portion of the positive electrode active material layer at a position corresponding to the second corner part about the winding axis is defined as a second positive electrode folding groove, an interval between the first positive electrode folding groove and the second positive electrode folding groove may reduce gradually toward the winding axis.

The secondary battery proposed here may further include a nonaqueous electrolyte solution accommodated in the battery case.

DETAILED DESCRIPTION

Hereinafter, an embodiment of a secondary battery disclosed here will be described with reference to the drawings. Matters other than those mentioned particularly in the present specification that are necessary for implementation can be grasped as design matters for skilled persons based on conventional technologies in the field concerned. The present invention may be implemented on the basis of contents disclosed in the present specification and technological common knowledge in the field concerned. Note that members and portions for performing the same functions will be shown by the same symbols to be described in the following drawings.

In the present specification, a "battery" is a term indicating a general storage device from which electric energy is taken out and is a concept including a primary battery and a secondary battery. The "secondary battery" refers to a general storage device allowing repetitive charge and discharge and includes a so-called storage battery such as a lithium secondary battery, a nickel hydrogen battery, and a nickel cadmium battery. Hereinafter, using a lithium-ion secondary battery that is a type of the secondary battery as an example, the secondary battery disclosed here will be described in detail. However, the secondary battery disclosed here is not limited to the embodiment described here.

Figure 1:
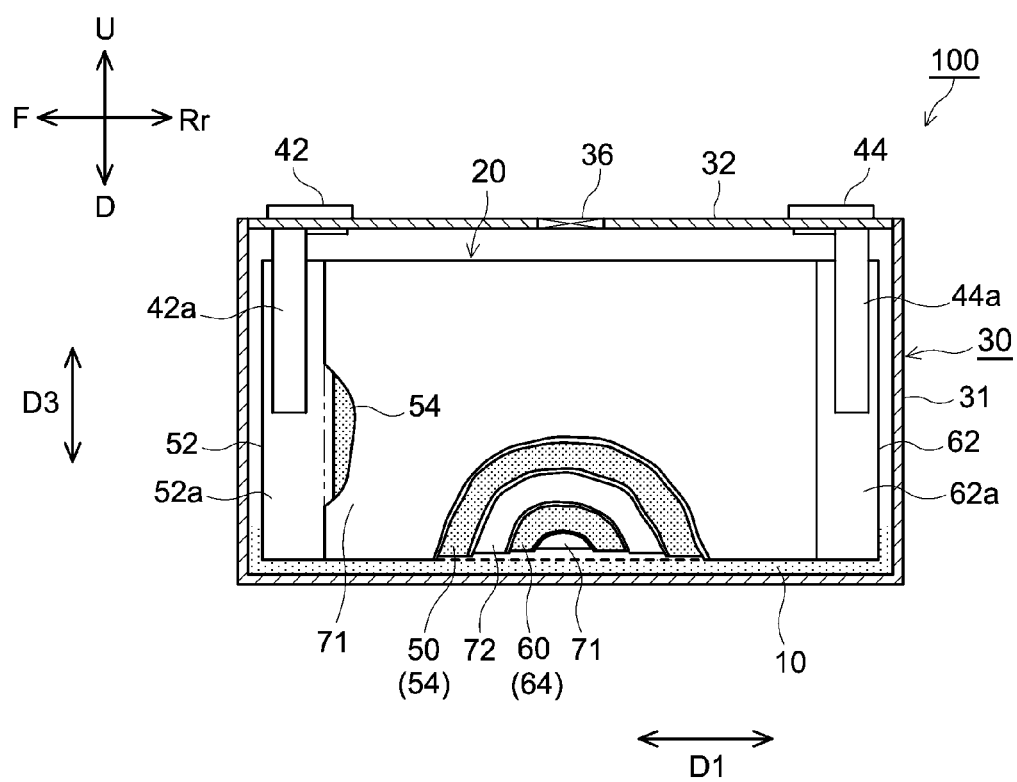
FIG. 1 is a cross-sectional view schematically showing the internal structure of a secondary battery according to an embodiment and is a view when seen from a second direction.

FIG. 1 is a cross-sectional view schematically showing the internal structure of a secondary battery 100 according to the present embodiment. In the present embodiment, it is assumed that the secondary battery 100 is arranged in a three-dimensional space shown by a first direction D1, a second direction D2 (see FIG. 3), and a third direction D3 crossing (here, orthogonal to) each other. In FIG. 1, or the like, symbols F, Rr, L, R, U, and D show a front side, a rear side, a left side, a right side, an upper side, and a down side, respectively. For example, the first direction D1 shows a front-and-rear direction, the second direction D2 shows a right-and-left direction, and the third direction D3 shows an up-and-down direction. The first direction D1 is a direction in which a winding axis W1 (see FIG. 2) extends and is also called a winding axis direction D1. The second direction D2 is also called a reference direction D2. The reference direction D2 is a direction crossing (here, orthogonal to) the winding axis direction D1.

As shown in FIG. 1, the secondary battery 100 according to the present embodiment is a closed-type lithium-ion secondary battery including a battery case 30, a wound electrode body 20, a nonaqueous electrolyte solution 10.

The battery case 30 accommodates the wound electrode body 20 and the nonaqueous electrolyte solution 10 in a closed state. In the present embodiment, the shape of the battery case 30 is a cuboid shape and a flat square shape. The battery case 30 includes a body 31 and a lid body 32. The body 31 is a square hollow member having an opening part (not shown) at its one end (for example, an upper end). The lid body 32 is a plate-shaped one used to close the opening part of the body 31. The lid body 32 is attached to the body 31.

The lid body 32 is provided with a positive electrode terminal 42 and a negative electrode terminal 44 for external connection and a safety valve 36. The safety valve 36 is used to release an internal pressure when the internal pressure of the battery case 30 increases to prescribed pressure or more. Further, the battery case 30 is provided with an inlet (not shown) used to inject the nonaqueous electrolyte solution 10 into the body 31. The material of the battery case 30 is not particularly limited, but a metal material such as aluminum that is lightweight and has high heat conductivity is used as the material of the battery case 30.

Figure 2:
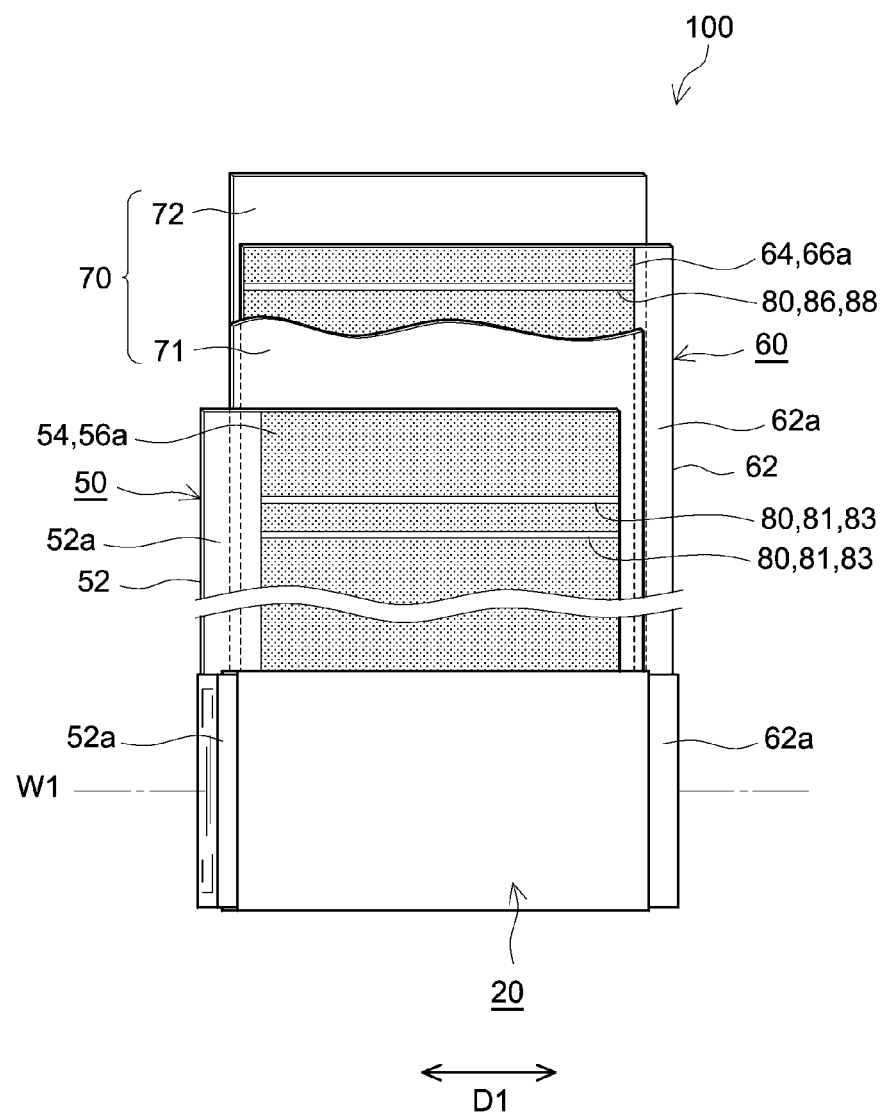
FIG. 2 is a schematic view showing the configuration of a wound electrode body of the secondary battery according to the embodiment and showing a developed part thereof.

FIG. 2 is a schematic view showing the configuration of the wound electrode body 20 of the secondary battery 100 according to the present embodiment. As shown in FIG. 2, the wound electrode body 20 has a long positive electrode sheet 50, a long negative electrode sheet 60, and a long separator 70. In the present embodiment, the separator 70 has a first separator 71 and a second separator 72 and is constituted by the two separators. The wound electrode body 20 is wound about the winding axis W1 with at least the positive electrode sheet 50 and the negative electrode sheet 60 overlapped with each other. Here, the positive electrode sheet 50, the negative electrode sheet 60, and the separator 70 are overlapped with each other. Specifically, the positive electrode sheet 50, the first separator 71, the negative electrode sheet 60, and the second separator 72 are overlapped with each other in this order.

In the positive electrode sheet 50, positive electrode active material layers 54 including a positive electrode active material are formed along a longitudinal direction on both surfaces of a long positive electrode collector 52. At an end on one end side (a left end side in FIG. 2) in a direction in which the winding axis W1 extends (here, the first direction D1) in the positive electrode collector 52, a non-forming part 52a in which the positive electrode active material layers 54 are not formed is provided. The non-forming part 52a of the positive electrode sheet 50 is a portion at which the positive electrode collector 52 is exposed. As shown in FIG. 1, a positive electrode collector plate 42a is bonded to the non-forming part 52a of the positive electrode sheet 50. The positive electrode terminal 42 is electrically connected to the positive electrode collector plate 42a.

In the present embodiment, one that is used as the positive electrode collector of the secondary battery of this type is available as the positive electrode collector 52 without any restriction. A metal positive electrode collector having excellent conductivity is preferably used as the positive electrode collector 52. A metal material such as aluminum, nickel, titanium, and stainless steel is employable as the positive electrode collector 52. Particularly, aluminum (for example, aluminum foil) is preferably used as the positive electrode collector 52.

Examples of the positive electrode active material included in the positive electrode active material layers 54 include a lithium composite metal oxide (such as $LiNi_{1/3}Co_{1/3}Mn_{1/3}O_2$, $LiNiO_2$, $LiCoO_2$, $LiFeO_2$, $LiMn_2O_4$, $LiNi_{0.5}Mn_{1.5}O_4$, $LiCrMnO_4$, and $LiFePO_4$) having a layer structure, a spinel structure, or the like. The positive electrode active material layers 54 may be formed in such a manner that a positive electrode active material and a material (such as a conductive material and a binder) used where necessary are dispersed into an appropriate solvent (for example, N-methyl-2-pyrrolidone: NMP) to prepare a paste-shaped (or a slurry-shaped) composition and an appropriate amount of the composition is imparted to the surfaces of the positive electrode collector 52 and dried.

As shown in FIG. 2, negative electrode active material layers 64 including a negative electrode active material are formed along the longitudinal direction on one surface or both surfaces (both surfaces in the present embodiment) of a long negative electrode collector 62 in the negative electrode sheet 60. At an end on the other end side (a right end side in FIG. 2) in a direction in which the winding axis W1 extends in the negative electrode collector 62, a non-forming part 62a in which the negative electrode active material layers 64 are not formed is provided. The non-forming part 62a of the negative electrode sheet 60 is a portion at which the negative electrode collector 62 is exposed. As shown in FIG. 1, a negative electrode collector plate 44a is bonded to the non-forming part 62a of the negative electrode sheet 60. The negative electrode terminal 44 is electrically connected to the negative electrode collector plate 44a.

In the present embodiment, one that is used as the negative electrode collector of the secondary battery of this type is available as the negative electrode collector 62 without any restriction. A metal negative electrode collector having excellent conductivity is preferably used as the negative electrode collector 62. Copper (for example, copper foil) or an alloy mainly composed of copper is available as the negative electrode collector 62.

Examples of a negative electrode active material included in the negative electrode active material layers 64 include a granular (spherical or squamous) carbon material at least partially having a graphite structure (for example, a layer structure), a lithium transition metal composite oxide (for example, a lithium-titanate composite oxide such as $Li_4Ti_5O_{12}$), and a lithium transition metal composite nitride. The negative electrode active material layers 64 may be formed in such a manner that a negative electrode active material and a material (such as a binder) used where necessary are dispersed into an appropriate solvent (for example, ion-exchange water) to prepare a paste-shaped (or a slurry-shaped) composition and an appropriate amount of the composition is imparted to the surfaces of the negative electrode collector 62 and dried.

As shown in FIG. 2, a separator including a known porous sheet is available as the separator 70 (specifically, the first separator 71 and the second separator 72) without any restriction. Examples of the separator 70 include a porous sheet (such as a film and a nonwoven fabric) made of a resin such as polyethylene (PE), polypropylene (PP), polyester, cellulose, and polyamide. The porous sheet may have a single-layer structure or a plural-layer structure composed of two or more layers (for example, a three-layer structure in which PP layers are laminated on both surfaces of a PE layer). Further, the porous sheet may be configured to include a porous heat-resistant layer(s) on its one surface or both surfaces. As the heat-resistant layer, a layer including, for example, an inorganic filler and a binder (for example, a filler layer) is available. For example, alumina, boehmite, silica, or the like is preferably available as the inorganic filler.

As shown in FIG. 1, the nonaqueous electrolyte solution 10 accommodated in the battery case 30 together with the wound electrode body 20 contains supporting electrolyte in an appropriate nonaqueous solvent, and a known nonaqueous electrolyte solution is available without any restriction. Ethylene carbonate (EC), diethyl carbonate (DEC), dimethyl carbonate (DMC), ethyl methyl carbonate (EMC), or the like is, for example, available as the nonaqueous solvent. Further, lithium electrolyte (such as LiBOB and $LiPF_6$) is, for example, suitably available as the supporting electrolyte. In the present embodiment, LiBOB is employed as the supporting electrolyte. In this case, the content of the LiBOB in the nonaqueous electrolyte solution 10 is preferably in the range of 0.3 wt % to 0.6 wt %.

Figure 3:
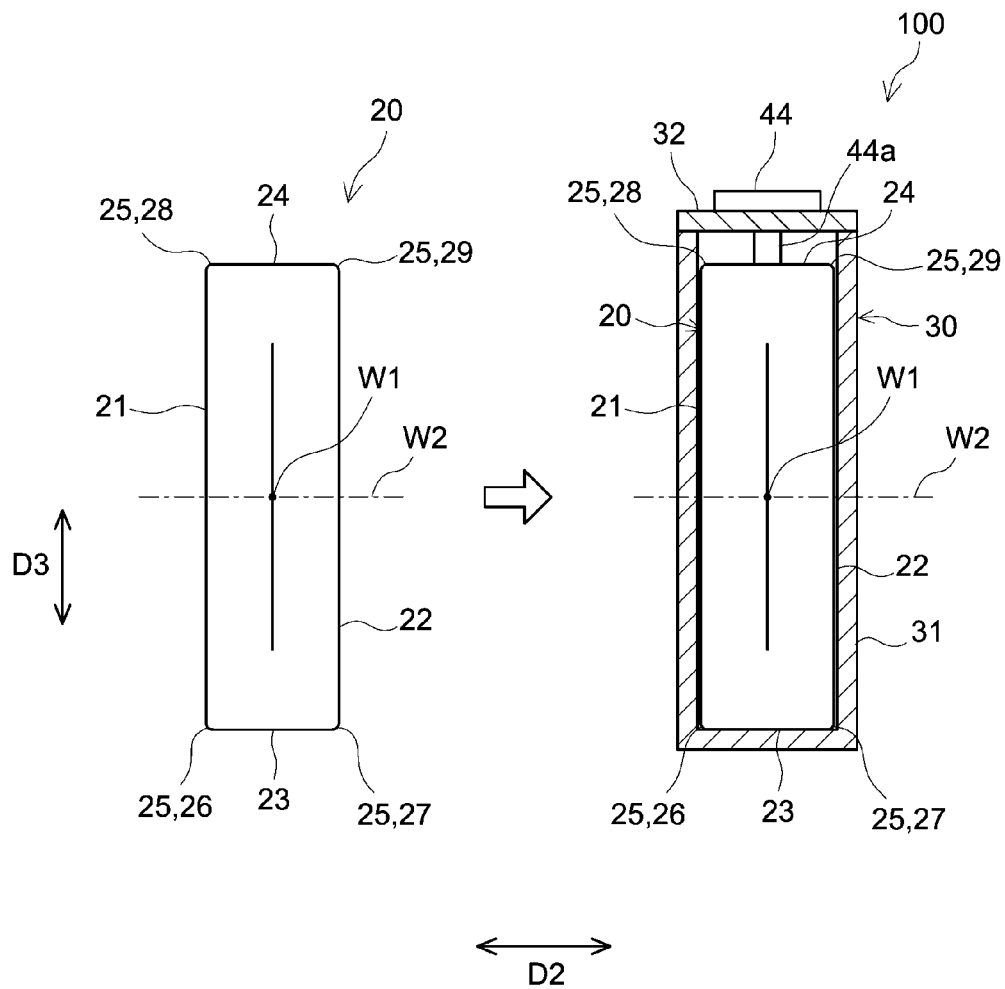
FIG. 3 is a cross-sectional view schematically showing a state in which an electrolyte electrode body and the wound electrode body are accommodated in a battery case and is a view when seen from a winding axis direction.

In the present embodiment, the wound electrode body 20 is configured to be wound about the winding axis W1 with at least the positive electrode sheet 50 and the negative electrode sheet 60 overlapped with each other as shown in FIG. 2. As shown in FIG. 3, the shape of the wound electrode body 20 when seen from the winding axis direction D1 is a rectangular shape. Note that the outer peripheral shape of the wound electrode body 20 is shown but the wound state of the wound electrode body 20 is omitted in FIG. 3.

Here, the wound electrode body 20 has a first flat surface 21, a second flat surface 22, a third flat surface 23, and a fourth flat surface 24. Each of the first flat surface 21 to the fourth flat surface 24 constitutes a part of the outer peripheral surface of the wound electrode body 20. The first flat surface 21 and the second flat surface 22 face each other with the winding axis W1 held therebetween and are arranged side by side in the second direction D2. The third flat surface 23 and the fourth flat surface 24 face each other with the winding axis W1 held therebetween and are arranged side by side in the third direction D3.

In the present embodiment, the wound electrode body 20 has corner parts 25 positioned at the four corners of the wound electrode body 20 when seen from the winding axis direction D1. The corner parts 25 have an acute square shape in the present embodiment but may have a rounded shape. That is, the corner parts 25 may have a curve. Here, a corner part 25 positioned between the first flat surface 21 and the third flat surface 23 is called a first corner part 26, and a corner part 25 positioned between the second flat surface 22 and the third flat surface 23 is called a second corner part 27. Further, a corner part 25 positioned between the first flat surface 21 and the fourth flat surface 24 is called a third corner part 28, and a corner part 25 positioned between the second flat surface 22 and the fourth flat surface 24 is called a fourth corner part 29.

Here, an axis passing through the winding axis W1 and extending in the reference direction D2 when seen from the winding axis direction D1 is defined as a reference axis W2. The first corner part 26 and the second corner part 27 are positioned on one side (here, the lower side) of the reference axis W2. The third corner part 28 and the fourth corner part 29 are positioned on the other side (here, the upper side) of the reference axis W2.

Figure 4:
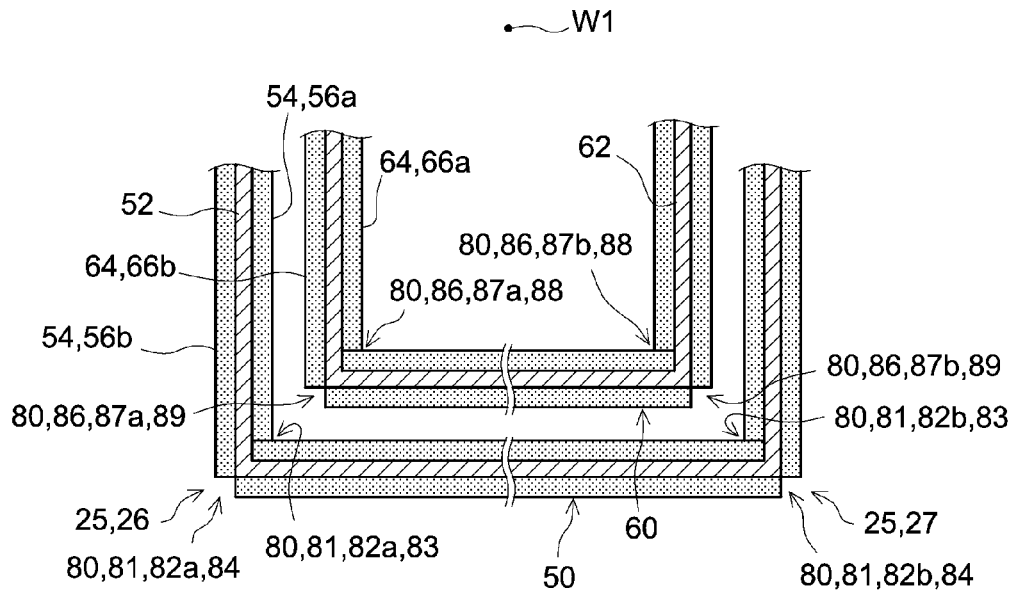
FIG. 4 is a cross-sectional view schematically showing parts of a positive electrode sheet and a negative electrode sheet positioned at a first corner part and a second corner part, respectively, and is a view when seen from the winding axis direction.

FIG. 4 is a cross-sectional view schematically showing parts of the positive electrode sheet 50 and the negative electrode sheet 60 positioned at the first corner part 26 and the second corner part 27. Note that the separator 70 is omitted in FIG. 4. In the present embodiment, folding grooves 80 are formed on the positive electrode active material layers 54 and the negative electrode active material layers 64 at positions corresponding to the corner parts 25 about the winding axis W1 in the positive electrode sheet 50 and the negative electrode sheet 60 as shown in FIG. 4. In other words, the folding grooves 80 are formed at the portions of the positive electrode active material layers 54 positioned at the corner parts 25 and the portions of the negative electrode active material layers 64 positioned at the corner parts 25. Note that the width of the folding grooves 80 is not particularly limited. The shape of the folding grooves 80 can possibly be a linear shape depending on the width of the folding grooves 80. The folding grooves 80 may be linear ones, i.e., folding lines. The folding grooves 80 also include folding lines. As shown in FIG. 2, the folding grooves 80 are grooves extending along the winding axis direction D1. Note that although omitted in FIG. 2, the folding grooves 80 may be formed on the separator 70 (specifically, the first separator 71 and the second separator 72) at the positions corresponding to the corner parts 25 about the winding axis W1. Below, the description "positioned at the corner parts 25 (or the first corner part 26 to the fourth corner part 29)" will refer to the description "at positions corresponding to the corner parts 25 (or the first corner part 26 to the fourth corner part 29) about the winding axis W1". Here, as shown in FIG. 4, the folding grooves 80 have positive electrode folding grooves 81 formed at the portions of the positive electrode active material layers 54 positioned at the corner parts 25 and negative electrode folding grooves 86 formed at the portions of the negative electrode active material layers 64 positioned at the corner parts 25.

In the present embodiment, grooves formed at the portions of the positive electrode active material layers 54 positioned at the first corner part 26, the second corner part 27, the third corner part 28, and the fourth corner part 29 among the positive electrode folding grooves 81 are called first positive electrode folding grooves 82a, second positive electrode folding grooves 82b, third positive electrode folding grooves 82c (see FIG. 7), and fourth positive electrode folding grooves 82d (see FIG. 7) respectively. Note that although only the first corner part 26 and the second corner part 27 are shown in FIG. 4, the third corner part 28 and the fourth corner part 29 are also configured so as to correspond to the first corner part 26 and the second corner part 27.

In the present embodiment, the positive electrode active material layers 54 are formed on both surfaces of the positive electrode collector 52 as shown in FIG. 4. The positive electrode active material layers 54 have an inside positive electrode active material layer 56a formed on a surface on the side of the winding axis W1 in the positive electrode collector 52 and an outside positive electrode active material layer 56b formed on a surface on the side opposite to the side of the winding axis W1 in the positive electrode collector 52. Here, the positive electrode folding grooves 81 are formed on the inside positive electrode active material layer 56a and the outside positive electrode active material layer 56b. Each of the first positive electrode folding groove 82a to the fourth positive electrode folding groove 82d has an inside positive electrode folding groove 83 formed on the inside positive electrode active material layer 56a and an outside positive electrode folding groove 84 formed on the outside positive electrode active material layer 56b.

In the present embodiment, grooves formed at the portions of the negative electrode active material layers 64 positioned at the first corner part 26, the second corner part 27, the third corner part 28, and the fourth corner part 29 among the negative electrode folding grooves 86 are called first negative electrode folding grooves 87a, second negative electrode folding grooves 87b, third negative electrode folding grooves 87c (see FIG. 7), and fourth negative electrode folding grooves 87d (see FIG. 7) respectively.

As described above, the negative electrode active material layers 64 are formed on both surfaces of the negative electrode collector 62 as shown in FIG. 4. The negative electrode active material layers 64 have an inside negative electrode active material layer 66a formed on a surface on the side of the winding axis W1 in the negative electrode collector 62 and an outside negative electrode active material layer 66b formed on a surface on the side opposite to the side of the winding axis W1 in the negative electrode collector 62. Here, the negative electrode folding grooves 86 are formed on the inside negative electrode active material layer 66a and the outside negative electrode active material layer 66b. Each of the first negative electrode folding groove 87a to the fourth negative electrode folding groove 87d has an inside negative electrode folding groove 88 formed on the inside negative electrode active material layer 66a and an outside negative electrode folding groove 89 formed on the outside negative electrode active material layer 66b.

Figure 7:
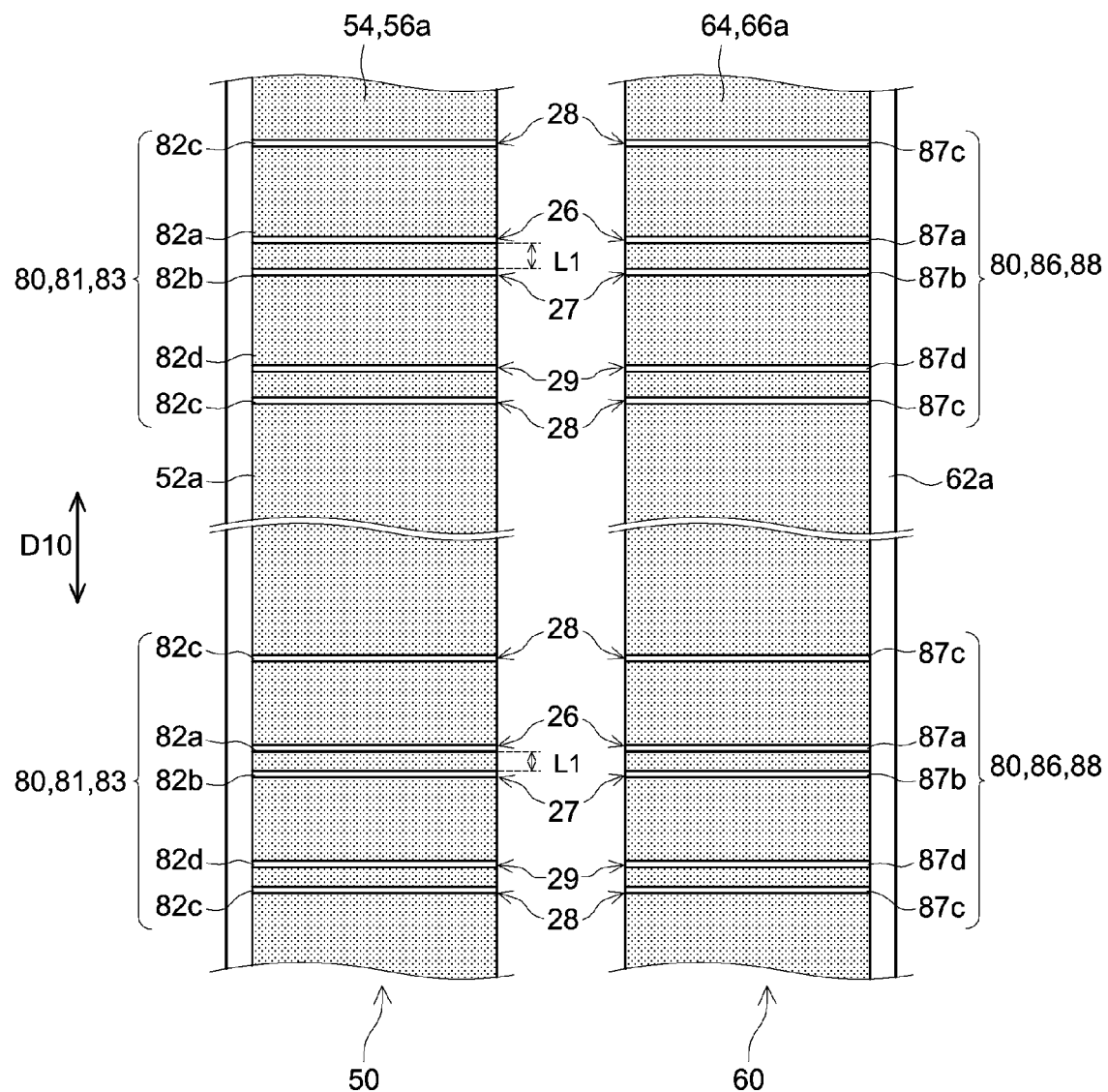
FIG. 7 is a view in which the positive electrode sheet and the negative electrode sheet are developed and is a view showing the inside surfaces of the positive electrode sheet and the negative electrode sheet.

FIG. 7 is a view in which the positive electrode sheet 50 and the negative electrode sheet 60 are developed and is a view showing the inside surfaces of the positive electrode sheet 50 and the negative electrode sheet 60. In FIG. 7, a longitudinal direction D10 shows a direction in which the positive electrode sheet 50 and the negative electrode sheet 60 are wound. On the space of FIG. 7, a lower side shows a side close to the winding axis W1, that is, the winding start side of the positive electrode sheet 50 and the negative electrode sheet 60, and a distance from the winding axis W1 increases from the lower side to an upper side. In the present embodiment, the positive electrode folding grooves 81 have a plurality of the first positive electrode folding grooves 82a, a plurality of the second positive electrode folding grooves 82b, a plurality of the third positive electrode folding grooves 82c, and a plurality of the fourth positive electrode folding grooves 82d as shown in FIG. 7.

Here, an interval L1 between the first positive electrode folding grooves 82a and the second positive electrode folding grooves 82b adjacent to each other in the longitudinal direction D10 of the positive electrode sheet 50 (hereinafter simply called the adjacent first positive electrode folding grooves 82a and the second positive electrode folding grooves 82b) reduces toward the winding axis W1, that is, toward the winding start side of the positive electrode sheet 50 as shown in FIG. 7. Specifically, the interval between the inside positive electrode folding grooves 83 in the adjacent first positive electrode folding grooves 82a and the second positive electrode folding grooves 82b reduces toward the winding axis W1. Although omitted in FIG. 7, the interval between the outside positive electrode folding grooves 84 in the adjacent first positive electrode folding grooves 82a and the second positive electrode folding grooves 82b also reduces toward the winding axis W1. Similarly, the interval between the adjacent third positive electrode folding grooves 82c and the fourth positive electrode folding grooves 82d reduces toward the winding axis W1 as shown in FIG. 7. The interval between the adjacent first positive electrode folding grooves 82a and the third positive electrode folding grooves 82c reduces toward the winding axis W1. The interval between the adjacent second positive electrode folding grooves 82b and the fourth positive electrode folding grooves 82d reduces toward the winding axis W1.

Note that the interval between the negative electrode folding grooves 86 is similar to the interval between the positive electrode folding grooves 81. In the present embodiment, the negative electrode folding grooves 86 have a plurality of the first negative electrode folding grooves 87a, a plurality of the second negative electrode folding grooves 87b, a plurality of the third negative electrode folding grooves 87c, and a plurality of the fourth negative electrode folding grooves 87d. The interval between the first negative electrode folding grooves 87a and the second negative electrode folding grooves 87b adjacent to each other in the longitudinal direction D10 of the negative electrode sheet 60 (hereinafter simply called the adjacent first negative electrode folding grooves 87a and the second negative electrode folding grooves 87b) reduces toward the winding axis W1, that is, toward the winding start side of the negative electrode sheet 60. Specifically, the interval between the inside negative electrode folding grooves 88 in the adjacent first negative electrode folding grooves 87a and the second negative electrode folding grooves 87b reduces toward the winding axis W1. Although omitted in FIG. 7, the interval between the outside negative electrode folding grooves 89 in the adjacent first negative electrode folding grooves 87a and the second negative electrode folding grooves 87b also reduces toward the winding axis W1. Similarly, the interval between the adjacent third negative electrode folding grooves 87c and the fourth negative electrode folding grooves 87d reduces toward the winding axis W1. The interval between the adjacent first negative electrode folding grooves 87a and the third negative electrode folding grooves 87c reduces toward the winding axis W1. Further, the interval between the adjacent second negative electrode folding grooves 87b and the fourth negative electrode folding grooves 87d reduces toward the winding axis W1.

Figure 5:
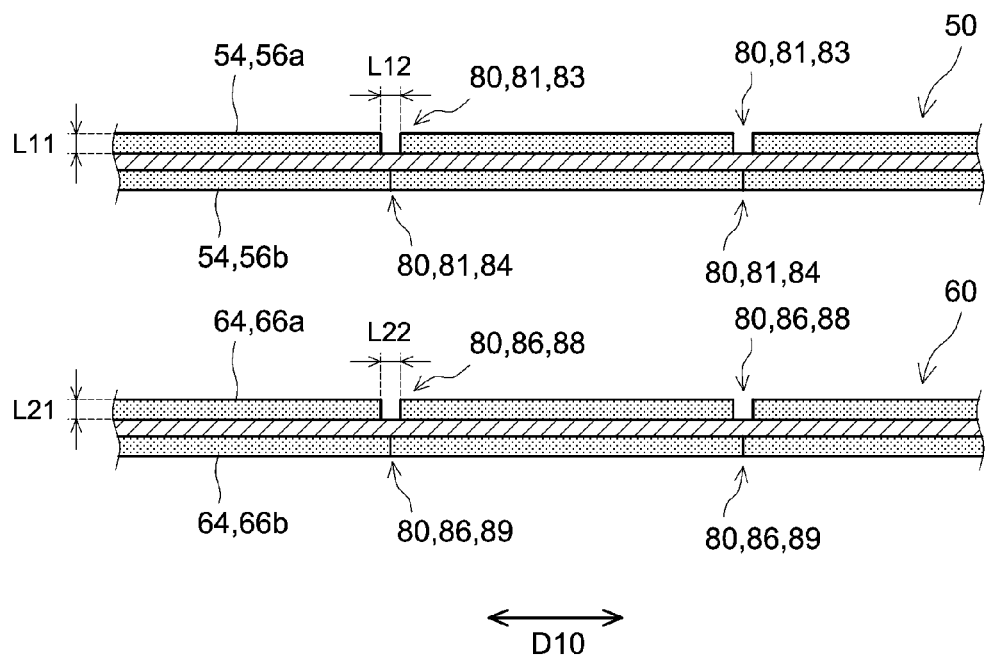
FIG. 5 is a view showing a state in which the positive electrode sheet and the negative electrode sheet are developed and is a schematic view showing the shapes of positive electrode folding grooves and negative electrode folding grooves.

Note that the shape of the folding grooves 80 is not particularly limited. The shape of the positive electrode folding grooves 81 and the shape of the negative electrode folding grooves 86 are the same in the present embodiment but may be different from each other. Further, the shape of the inside positive electrode folding grooves 83 is different from that of the outside positive electrode folding grooves 84 as shown in FIG. 5 in the present embodiment. Similarly, the shape of the inside negative electrode folding grooves 88 is different from that of the outside negative electrode folding grooves 89. However, the shape of the inside positive electrode folding grooves 83 may be the same as that of the outside positive electrode folding grooves 84, and the shape of the inside negative electrode folding grooves 88 may be the same as that of the outside negative electrode folding grooves 89. In the present embodiment, the shape of the inside positive electrode folding grooves 83 is the same as that of the inside negative electrode folding grooves 88. Further, the shape of the outside positive electrode folding grooves 84 is the same as that of the outside negative electrode folding grooves 89.

Figure 6A:
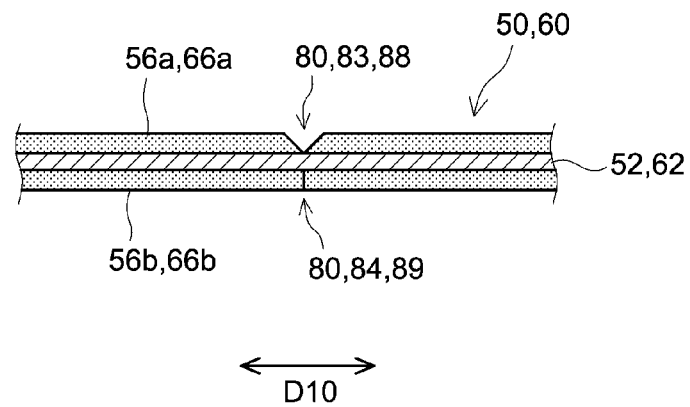
FIG. 6A is a schematic view showing a positive electrode folding groove (negative electrode folding groove) according to a modified example.
Figure 6B:
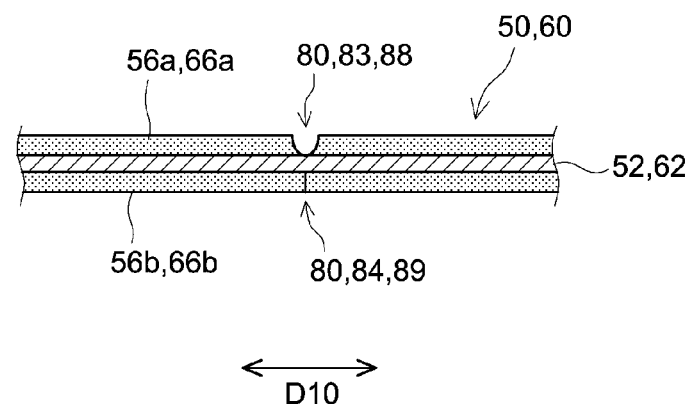
FIG. 6B is a schematic view showing a positive electrode folding groove (negative electrode folding groove) according to a modified example.

Specifically, each of the cross-sectional shapes of the inside positive electrode folding grooves 83 and the inside negative electrode folding grooves 88 is, for example, a rectangular shape as shown in FIG. 5. However, each of the cross-sectional shapes of the inside positive electrode folding grooves 83 and the inside negative electrode folding grooves 88 is not particularly limited and may be a V-shape as shown in, for example, FIG. 6A. Further, each of the cross-sectional shapes of the inside positive electrode folding grooves 83 and the inside negative electrode folding grooves 88 may be a semi-circular shape as shown in FIG. 6B. Each of the shapes of the outside positive electrode folding grooves 84 and the outside negative electrode folding grooves 89 is a slit shape as shown in FIG. 5 but is not particularly limited. In the present embodiment, it is assumed that slits are also included in grooves. Further, the folding grooves 80 are continuous grooves in the present embodiment. However, the folding grooves 80 may not be continuous but may be dotted-line grooves.

In the present embodiment, a width L12 of the inside positive electrode folding grooves 83 is greater than that of the outside positive electrode folding grooves 84. However, the width L12 of the inside positive electrode folding grooves 83 may be the same as or smaller than that of the outside positive electrode folding grooves 84. Similarly, a width L22 of the inside negative electrode folding grooves 88 is greater than that of the outside negative electrode folding grooves 89. However, the width L22 of the inside negative electrode folding grooves 88 may be the same as or smaller than that of the outside negative electrode folding grooves 89. Note that in the present embodiment, the widths of the grooves 83, 84, 88, and 89 indicate the lengths of the grooves 83, 84, 88, and 89, respectively, in the longitudinal direction D10, that is, in the winding direction of the positive electrode sheet 50 or the negative electrode sheet 60.

In the present embodiment, the width L12 of the inside positive electrode folding grooves 83 is the same as or greater than a thickness L11 of the inside positive electrode active material layer 56a as shown in FIG. 5. Similarly, the width L22 of the inside negative electrode folding grooves 88 is the same as or greater than a thickness L21 of the inside negative electrode active material layer 66a.

Note that in the present embodiment, the outside positive electrode folding grooves 84 are formed at the portions of the outside positive electrode active material layer 56b corresponding to the inside positive electrode folding grooves 83, i.e., at the portions of the outside positive electrode active material layer 56b positioned on the side opposite to the side of the inside positive electrode folding grooves 83 with respect to the positive electrode collector 52. Similarly, the outside negative electrode folding grooves 89 are formed at the portions of the outside negative electrode active material layer 66b corresponding to the inside negative electrode folding grooves 88, i.e., at the portions of the outside negative electrode active material layer 66b positioned on the side opposite to the side of the inside negative electrode folding grooves 88 with respect to the negative electrode collector 62.

Note that a method for forming the folding grooves 80 is not particularly limited. In the present embodiment, the formation of the inside positive electrode folding grooves 83 and the inside negative electrode folding grooves 88 on the inside positive electrode active material layer 56a and the inside negative electrode active material layer 66a, respectively, is allowed by, for example, applying laser light onto the inside positive electrode active material layer 56*a* and the inside negative electrode active material layer 66*a*. The formation of the outside positive electrode folding grooves 84 and the outside negative electrode folding grooves 89 on the outside positive electrode active material layer 56*b* and the outside negative electrode active material layer 66*b*, respectively, is allowed by, for example, applying laser light onto the outside positive electrode active material layer 56*b* and the outside negative electrode active material layer 66*b*. Note that the outside positive electrode folding grooves 84 and the outside negative electrode folding grooves 89 may be formed by putting a so-called Thompson blade on the outside positive electrode active material layer 56*b* and the outside negative electrode active material layer 66*b*.

Further, the wound electrode body 20 is wound to be manufactured by a so-called winding machine with the positive electrode sheet 50, the negative electrode sheet 60, and the separator 70 overlapped with each other in the present embodiment. The formation of the folding grooves 80 on the positive electrode active material layer 54 and the negative electrode active material layer 64 is allowed by applying laser light onto the positive electrode active material layer 54 and the negative electrode active material layer 64 at prescribed timing (for example, at timing at which the portions of the positive electrode active material layer 54 and the negative electrode active material layer 64 that can possibly be positioned at the corner parts 25 (see FIG. 4) pass through a region onto which the laser light is applied) when the positive electrode sheet 50, the negative electrode sheet 60, and the separator 70 are wound by the winding machine in an overlapped state.

As described above, the wound electrode body 20 is wound to have a rectangular shape when seen from the winding axis direction D1 about the winding axis W1 with at least the positive electrode sheet 50 and the negative electrode sheet 60 overlapped with each other as shown in FIG. 2 in the present embodiment. As shown in FIG. 3, the wound electrode body 20 has the corner parts 25 positioned at the four corners thereof when seen from the winding axis direction D1. As shown in FIG. 4, in the positive electrode sheet 50 and the negative electrode sheet 60, the folding grooves 80 are formed along the winding axis direction D1 on the positive electrode active material layers 54 and the negative electrode active material layers 64 at the positions corresponding to the corner parts 25 about the winding axis W1. Thus, since the positive electrode sheet 50 and the negative electrode sheet 60 are foldable along the folding grooves 80 when the wound electrode body 20 is wound, the wound electrode body 20 is easily folded. Accordingly, the shape of the wound electrode body 20 when seen from the winding axis direction D1 is easily formed into a rectangular shape as shown in FIG. 3. Further, since the rectangular wound electrode body 20 is accommodated in the square battery case 30 as shown in FIG. 3, the dead space between the battery case 30 and the wound electrode body 20 may be reduced. As a result, an improvement in the volume efficiency of the wound electrode body 20 is allowed.

In the present embodiment, the folding grooves 80 have the inside positive electrode folding grooves 83 formed on the inside positive electrode active material layer 56*a* formed on the surface on the side of the winding axis W1 in the positive electrode collector 52 and the outside positive electrode folding grooves 84 formed on the outside positive electrode active material layer 56*b* formed on the surface on the side opposite to the side of the winding axis W1 in the positive electrode collector 52 as shown in FIG. 4. As described above, even in a case in which the positive electrode active material layers 56*a* and 56*b* are formed on both surfaces of the positive electrode collector 52, the portions of the positive electrode sheet 50 positioned at the corner parts 25 are easily folded along the folding grooves 83 and 84 since the folding grooves 83 and 84 are formed on each of the positive electrode active material layers 56*a* and 56*b*.

In the present embodiment, the inside positive electrode active material layer 56*a* gets into the inside positive electrode folding grooves 83 when the positive electrode sheet 50 is folded along the inside positive electrode folding grooves 83. Therefore, the width L12 of the inside positive electrode folding grooves 83 is made greater than that of the outside positive electrode folding grooves 84 as shown in FIG. 5 in the present embodiment. Further, the width L12 of the inside positive electrode folding grooves 83 is made the same as or greater than the thickness L11 of the inside positive electrode active material layer 56*a*. Thus, the inside positive electrode active material layer 56*a* easily gets into the inside positive electrode folding grooves 83 as shown in FIG. 4. Therefore, the portions of the corner parts 25 of the wound electrode body 20 are made hardly expandable.

In the present embodiment, the outside positive electrode folding grooves 84 are expanded while the inside positive electrode folding grooves 83 are narrowed when the positive electrode sheet 50 is folded along the positive electrode folding grooves 81. Therefore, the cross-sectional shape of the inside positive electrode folding grooves 83 is made different from that of the outside positive electrode folding grooves 84 as shown in FIG. 5 to suit the above states of the folding grooves 83 and 84, whereby the positive electrode sheet 50 positioned at the corner parts 25 is made easily foldable.

In the present embodiment, the folding grooves 80 formed on the positive electrode active material layer 54 at the position corresponding to the first corner part 26 about the winding axis W1 are defined as the first positive electrode folding grooves 82*a*, and the folding grooves 80 formed on the positive electrode active material layer 54 at the position corresponding to the second corner part 27 about the winding axis W1 are defined as the second positive electrode folding grooves 82*b* as shown in FIG. 4. As shown in FIG. 7, the interval L1 between the first positive electrode folding grooves 82*a* and the second positive electrode folding grooves 82*b* reduces toward the winding axis W1 (here, toward the lower side of FIG. 7). Here, the interval between the first corner part 26 and the second corner part 27 reduces toward the winding axis W1, that is, as the winding number of the wound electrode body 20 reduces. Accordingly, the interval L1 between the first positive electrode folding grooves 82*a* and the second positive electrode folding grooves 82*b* is reduced in conformity with the interval between the first corner part 26 and the second corner part 27 toward the winding axis W1, whereby the positive electrode sheet 50 is made easily foldable at the corner parts 25. As a result, the wound electrode body 20 formed into a rectangular shape when seen from the winding axis direction D1 as shown in FIG. 3 is easily manufactured.

In the present embodiment, the secondary battery 100 includes the nonaqueous electrolyte solution 10 accommodated in the battery case 30 as shown in FIG. 1. The nonaqueous electrolyte solution 10 may penetrate the wound electrode body 20 from the folding grooves 80 when injected into the battery case 30. Accordingly, an improvement in the penetration speed of the nonaqueous electrolyte solution 10 during injection is allowed.

Note that the folding grooves 80 are formed on both the positive electrode active material layers 54 and the negative electrode active material layers 64 in the present embodiment. However, the folding grooves 80 may be formed on at least one of the positive electrode active material layers 54 and the negative electrode active material layers 64. For example, the folding grooves 80 may be formed on the positive electrode active material layers 54 but may not be formed on the negative electrode active material layers 64. For example, the folding grooves 80 may not be formed on the positive electrode active material layers 54 but may be formed on the negative electrode active material layers 64.

What is claimed is:

1. A secondary battery comprising:
a square battery case; and
a wound electrode body accommodated in the battery case, wherein
the wound electrode body has a positive electrode sheet and a negative electrode sheet at least overlapping with each other to be wound about a winding axis to have a rectangular shape when seen from a winding axis direction,
the wound electrode body has corner parts positioned at four corners of the wound electrode body when seen from the winding axis direction,
the positive electrode sheet has a positive electrode collector and a positive electrode active material layer formed on the positive electrode collector,
the negative electrode sheet has a negative electrode collector and a negative electrode active material layer formed on the negative electrode collector, and
folding grooves are formed along the winding axis direction in at least one of the positive electrode active material layer and the negative electrode active material layer at positions corresponding to the corner parts about the winding axis in the positive electrode sheet and the negative electrode sheet.

2. The secondary battery according to claim 1, wherein the positive electrode active material layer has
an inside positive electrode active material layer formed on a surface of the positive electrode collector on the winding axis side, and
an outside positive electrode active material layer formed on a surface of the positive electrode collector on an opposite side thereof to the winding axis, and
the folding grooves have
an inside positive electrode folding groove formed on the inside positive electrode active material layer, and
an outside positive electrode folding groove formed on the outside positive electrode active material layer.

3. The secondary battery according to claim 2, wherein a width of the inside positive electrode folding groove is greater than a width of the outside positive electrode folding groove.

4. The secondary battery according to claim 2, wherein the width of the inside positive electrode folding groove is same as or greater than a thickness of the inside positive electrode active material layer.

5. The secondary battery according to claim 2, wherein a cross-sectional shape of the inside positive electrode folding groove is different from a cross-sectional shape of the outside positive electrode folding groove.

6. The secondary battery according to claim 1, wherein the folding grooves are formed on the positive electrode active material layer,
when an axis passing through the winding axis and extending in a reference direction crossing the winding axis direction is defined as a reference axis when seen from the winding axis direction, the corner parts have a first corner part and a second corner part positioned on one side of the reference axis when seen from the winding axis direction, and
when an folding groove of the folding grooves that is formed at a portion of the positive electrode active material layer at a position corresponding to the first corner part about the winding axis is defined as a first positive electrode folding groove and an folding groove of the folding grooves that is formed at a portion of the positive electrode active material layer at a position corresponding to the second corner part about the winding axis is defined as a second positive electrode folding groove, an interval between the first positive electrode folding groove and the second positive electrode folding groove reduces gradually toward the winding axis.

7. The secondary battery according to claim 1, further comprising:
a nonaqueous electrolyte solution accommodated in the battery case.

* * * * *